Oct. 20, 1953
C. W. SHERWIN
2,655,836
REFLECTION PLOTTING DEVICE
Filed Dec. 10, 1945
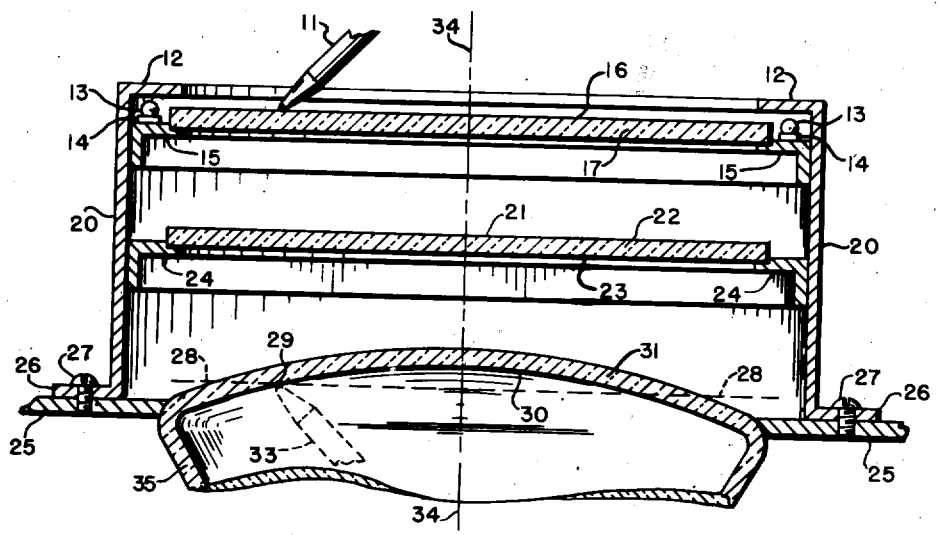
FIG. I
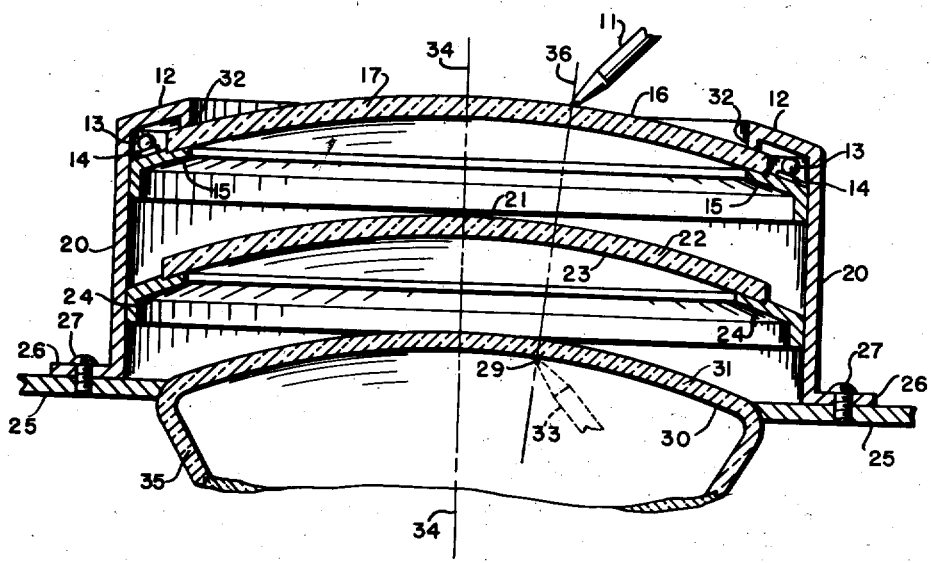
FIG. 2
INVENTOR
CHALMERS W. SHERWIN
BY
ATTORNEY Patented Oct. 20, 1953

2,655,836

UNITED STATES PATENT OFFICE 2,655,836

REFLECTION PLOTTING DEVICE

Chalmers W. Sherwin, Belmont, Mass., assignor, by mesne assignments, to the United States of America as represented by the Secretary of the Navy Application December 10, 1945, Serial No. 634,110

2 Claims. (Cl. 88—74)

This invention relates broadly to plotting devices and more particularly to a reflection plotting device for use with cathode ray tube indicators.

In the prior art a common method of positionally noting and "tracking" images appearing on the inner surface of a cathode ray tube screen, such as radar targets for example, has been to plot, with a glass marking pencil or scribe, the information directly on the screen or screen covering of the cathode ray tube as it appears on the inner surface of the screen. When plotting in this manner, it is difficult for the observer to make an accurate plot due to his inability to ascertain the exact point of contact of the large blunt point of the glass marking pencil with the plotting surface. Another inaccuracy inherent in this method arises from the parallax caused by the plotting surface being spaced away from the inner surface of the cathode ray tube, and this becomes increasingly serious when the cathode ray tube screen is not directly accessible for plotting but, as in some installations, is covered with transparent shatterproof and waterproof shields. A rotating cursor may also be used on the screen further precluding direct plotting thereon.

One of the objects of this invention is to provide a reflection plotting device which may be readily attached to any cathode ray tube over any protective shields or cursors provided thereon and which has a readily accessible plotting surface.

Another object of this invention is to provide a reflection plotting device for cathode ray tubes in which the plotting will be carried on by viewing a virtual image of the plotting scribe or pencil which will appear to be substantially superimposed on the inner surface of the cathode ray tube screen regardless of the actual distance of the plotting surface from the screen, thus minimizing or eliminating the errors ordinarily caused by parallax.

Still another object of this invention is to provide a reflection plotting device for cathode ray tubes in which the virtual image of the point of the plotting scribe or pencil will be viewed while plotting, enabling precise determination of the point of contact of the scribe and the plotting surface.

These and other objects of this invention will be more apparent to those skilled in the art from a consideration of the following detailed description when taken with the accompanying drawings, in which:

Fig. 1 represents a cross-sectional view of one embodiment of this invention; and Fig. 2 represents a cross-sectional view of another embodiment of this invention.

Referring now to Fig. 1, one embodiment of this invention is shown attached to a representative section of a cathode ray tube 35 and face 25 of a cathode ray tube indicator, whereby a plot may be made with a plotting scribe 11 on plotting surface 16 of images appearing on inner surface 30 of screen 31 of cathode ray tube 35 by observation through transparent surfaces 17 and 22 of the aforementioned images and a virtual reflection 33 of plotting scribe 11 appearing to be superimposed on inner surface 30 of screen 31.

A ringlike structure 20 is adapted at one end to be mounted about screen 31 of cathode ray tube 35 as by means of a flange 26 formed outwardly on the aforementioned end and fastened to indicator face 25, as by machine screws 27. Within and near the opposite end of structure 20, which extends outwardly from screen 31, a first circular sheet 17 of transparent material, such as glass, of uniform thickness is supported concentrically about and perpendicular to longitudinal axis 34 of cathode ray tube 35 as by a first inwardly extending flange 15 which is fastened by any suitable means to structure 20.

A number of small electric lights 13 are positioned within ring 20 in sockets 14 which are secured to flange 15 and spaced circumferentially about sheet 17 in such a manner as to provide edge lighting thereof. These electric lights are connected to an appropriate source of electric power (not shown) through a variable resistance (not shown) in order to permit adjustment of the illumination therefrom to a desired value.

Dispersal of light from the aforementioned electric lights other than into the interior of sheet 17 and across plotting surface 16 is prevented by flange 15 and a second flange 12 formed on the outer end of structure 20 extending inwardly over the edge of plotting surface 16 and separated a small distance therefrom.

A second circular sheet 22 of transparent material, such as glass, of uniform thickness is supported within structure 20 by a third inwardly extending flange 24 fastened to structure 20 by any suitable means. Sheet 22 is positioned concentrically about and perpendicular to longitudinal axis 34 of cathode ray tube 35 and between sheet 17 and screen 31. Sheet 22 is treated by means well known to the art, in such a manner as to present a partially reflecting surface 21 to sheet 17 and an attenuated reflecting surface 23 to screen 31 and is so positioned that the perpendicular optical distance from surface 21 to plotting surface 16 is equal to the mean perpendicular optical distance from surface 21 to inner surface 30 of screen 31.

The function of this embodiment is as follows:

An observer desiring to make a plot of images appearing on inner surface 30 of screen 31 plots directly with an appropriate scribe 11 on plotting surface 16. As scribe 11 approaches plotting surface 16 it will be illuminated by the aforementioned edge lighting of surface 16 and a reversed image thereof will be reflected by partially reflecting surface 21. The point of virtual image 33 of scribe 11 will appear, as illustrated at 29, along an imaginary plane 28 parallel to partially reflecting surface 21. Since, in the embodiment of Fig. 1, reflecting surface 21 is positioned optically equidistant from plotting surface 16 and inner surface 30 of screen 31 (neglecting the curvature of screen 31) the point of virtual image 33 will appear to be substantially superimposed upon inner surface 30 as at 29. The observer plots by watching virtual image 33 and moving scribe 11 until the point of virtual image 33 coincides with the desired image appearing on inner surface 30 of screen 31. Since the observer is viewing an image of scribe 11, and in addition, the previously described internal illumination of plotting surface 16 causes the point of contact of scribe 11 with plotting surface 16 to appear as a relatively bright dot, the observer will be enabled to determine the exact point of contact with great precision and accuracy. The inside surface 23 of sheet 22 is treated to attenuate the reflection of scribe 11 therefrom in order to prevent the formation of a double virtual image 33.

As mentioned above, the point of virtual image 33 will not appear in all positions, as scribe 11 is moved over plotting surface 16 to be exactly superimposed on inner surface 30 of screen 31 due to the curvature of screen 31 but will, for example, appear to be slightly below near the center and above near the edges, as shown by dotted line 28 in Fig. 1. Although this displacement is practically negligible when using the smaller sizes of cathode ray tubes, it may be advisable when plotting from large size cathode ray tubes to use an embodiment similar to that illustrated in Fig. 2.

Referring now to Fig. 2, a second embodiment of this invention is shown in which virtual image 33 of scribe 11 will, for all positions of scribe 11 on plotting surface 16 appear to be exactly superimposed on inner surface 30 of screen 31 when viewed radially from the center of curvature of inner surface 30 as along radii 36, and substantially superimposed when viewed from other angles. Corresponding parts of Figs. 1 and 2 are numbered correspondingly. Transparent sheets 17 and 22 are similar to those of the embodiment of Fig. 1 but are curved so as to have their centers of curvature common with that of inner surface 30 of screen 31. As in Fig. 1, partially reflecting surface 21 is optically equidistant from plotting surface 16 and inner surface 30 of screen 31.

It has been found from experience that in some installations better results will be obtained by providing only interior illumination of plotting surface 16. This may conveniently be accomplished by an appropriate shielding arrangement of the aforementioned electric lights. One method of preventing the dispersal of light over plotting surface 16 is illustrated in Fig. 2 where a lip 32 is formed at the inwardly extending end of flange 12 to enclose the space occupied by lights 13 except for the opening through which transparent sheet 17 projects. The illumination of plotting surface 16 should be kept as low as possible consistent with proper illumination of scribe 11 in order to permit ready discernment of images appearing on inner surface 30 of screen 31.

Tests have shown that if partially reflecting surface 21 is treated to be from 10 to 20 per cent reflective, a suitably apparent virtual image of scribe 11 will be visible and that double reflections of scribe 11 will be practically eliminated if surface 23 is treated to reduce the reflection therefrom to approximately 2 per cent.

It will be apparent that the invention in addition may be readily adapted, by use of watertight seals and transparent shatterproof sheets, to afford protection against damage to the cathode ray tube screen by water and breakage.

It is recognized that, to those skilled in the art, there will be apparent various modifications and arrangements which may be made without departing from the spirit and scope of the principles entailed. Another embodiment, for example, might utilize the outer surface of cathode ray tube screen 31, after proper treatment, as one of the transparent surfaces 21 or 23.

The invention is only to be limited by the appended claims.

What is claimed is:

1. A reflection plotting device for a cathode ray tube comprising, a ringlike structure adapted at one end to be supported by said cathode ray tube and having its other end extending outwardly from said tube, a curved sheet of transparent material forming a plotting surface, a curved transparent partially reflecting surface, and means for supporting said surfaces within said structure substantially parallel to one another and concentrically disposed about the longitudinal axis of said cathode ray tube, said plotting surface being positioned near said outwardly extending end of said structure, and said partially reflecting surface being positioned optically equidistant between said plotting surface and said cathode ray tube, whereby a plot may be made with a plotting scribe on said plotting surface of images appearing on said cathode ray tube by observation through said surfaces of one of said images and the virtual image of said scribe appearing superimposed on said cathode ray tube.

2. In combination with claim 1, a plurality of electric lights circumferentially disposed about the edge of said plotting surface in such a manner as to provide edge lighting thereof, said electric lights being so shielded as to prevent the dispersal of light other than into said plotting surface and across the surface thereof, whereby the point of said plotting scribe will be illuminated as it is brought into contact with said plotting surface.

CHALMERS W. SHERWIN.

References Cited in the file of this patent

UNITED STATES PATENTS

| Number | Name | Date |
|---|---|---|
| 1,970,035 | Enright | Aug. 14, 1934 |
| 2,122,918 | Phinney | July 5, 1938 |
| 2,220,861 | Blodgett | Nov. 5 1940 |
| 2,251,984 | Cleaver | Aug. 12, 1941 |
| 2,289,557 | Taylor | July 14, 1942 |
| 2,330,604 | Messner | Sept. 28, 1943 |
| 2,446,674 | Sproul | Aug. 10, 1948 |